United States Patent
Lin et al.

(10) Patent No.: US 7,089,628 B2
(45) Date of Patent: Aug. 15, 2006

(54) HINGE DESIGN FOR A COMPUTER

(75) Inventors: Ming-Te Lin, Hsichih (TW); Chih-Feng Jian, Taipei Hsien (TW); Yung-Lu Wu, Taipei (TW)

(73) Assignee: Quanta Computer, Inc., Taoyuan Shien (TW)

( * ) Notice: Subject to any disclaimer, the term of this patent is extended or adjusted under 35 U.S.C. 154(b) by 0 days.

(21) Appl. No.: 10/942,006

(22) Filed: Sep. 16, 2004

(65) Prior Publication Data

US 2006/0053590 A1    Mar. 16, 2006

(51) Int. Cl.
*E05C 17/64*    (2006.01)

(52) U.S. Cl. .......................................... 16/342; 16/337

(58) Field of Classification Search ............. 16/342, 16/337, 338, 340, 250, 289, 339, 251, 387; 361/683; 248/917, 920, 922; 455/575.3
See application file for complete search history.

(56) References Cited

U.S. PATENT DOCUMENTS

| | | | | | |
|---|---|---|---|---|---|
| 2,656,563 | A | * | 10/1953 | Jones ............................ | 16/327 |
| 4,964,193 | A | * | 10/1990 | Rommelfaenger et al. .... | 16/225 |
| 5,025,531 | A | * | 6/1991 | McCarty ...................... | 16/313 |
| 5,081,742 | A | * | 1/1992 | Kobayashi .................... | 16/337 |
| 5,109,570 | A | * | 5/1992 | Okada et al. ................. | 16/289 |
| 5,239,731 | A | * | 8/1993 | Lu ............................... | 16/340 |
| 5,611,114 | A | * | 3/1997 | Wood et al. .................. | 16/366 |
| 5,812,368 | A | * | 9/1998 | Chen et al. .................. | 361/681 |
| 5,913,351 | A | * | 6/1999 | Miura .......................... | 16/340 |
| 6,378,830 | B1 | * | 4/2002 | Lu ........................... | 248/278.1 |
| 6,470,532 | B1 | * | 10/2002 | Rude ........................... | 16/335 |
| 6,584,646 | B1 | * | 7/2003 | Fujita .......................... | 16/342 |
| 6,804,859 | B1 | * | 10/2004 | Lu et al. ....................... | 16/342 |
| 6,813,812 | B1 | * | 11/2004 | Lu et al. ....................... | 16/342 |
| 2002/0145847 | A1 | * | 10/2002 | Crosby ....................... | 361/683 |

FOREIGN PATENT DOCUMENTS

| GB | 2266920 | A | * | 11/1993 |
|---|---|---|---|---|
| JP | 06017570 | A | * | 1/1994 |

* cited by examiner

*Primary Examiner*—Chuck Y. Mah
*Assistant Examiner*—Mark T. Vogelbacker
(74) *Attorney, Agent, or Firm*—Rabin & Berdo, PC

(57) ABSTRACT

A new hinge design is used to connect a base unit and its display panel of a notebook computer. The new hinge design consists of a hinge bracket and a hinge shaft. The hinge bracket consists of a horizontal band, a vertical band, a barrel part and a bent band. The horizontal band and the vertical band are both mounted inside the base unit via holes thereon. The bent band bends from the vertical to the desired direction so as to shift a position of the hinge shaft. Owing to the position shift of the hinge shaft, the center of gravity of a notebook computer will also shift. The hinge shaft includes an attachment plate for mounting on the display panel.

8 Claims, 4 Drawing Sheets

HINGE DESIGN FOR A COMPUTER

BACKGROUND

1. Field of Invention

The present invention relates to a hinge design. More particularly, the present invention relates to a hinge design of a notebook computer.

2. Description of Related Art

A notebook computer is composed of a monitor pivotally mounted on a base unit by hinges. As the LCD panel, which is part of the monitor of the notebook computer, continues to go down in price, the notebook computer might be equipped with a larger LCD panel with lower cost. The monitor composed of a larger LCD panel with a larger cover housing the panel is heavier than before. A weight ratio of the monitor to the base unit rises as the panel gets heavier.

FIG. 1 illustrates a perspective view of a conventional notebook computer. Owing to the above-mentioned circumstances, i.e., the increased weight ratio of the monitor 102 to the base unit 100, the notebook computer may flip in the direction 108 more easily when a force 130 hits the display panel 102 at upright position. Obviously, adding weight to the base unit 100 of the notebook computer can solve this issue. However, doing so also increases the total weight of the notebook computer, which is a disadvantage for a portable device.

SUMMARY

It is therefore an objective of the present invention to provide a new hinge design.

In accordance with the foregoing and other objectives of the present invention, a new hinge design is used to connect a base unit and its display panel of a notebook computer. The new hinge design consists of a hinge bracket and a hinge shaft. The hinge shaft includes an attachment plate for mounting on the display panel. The hinge bracket consists of a horizontal band, a vertical band, a barrel part and a bent band. The horizontal band and the vertical band are both mounted inside the base unit via holes thereon. The bent band bends from the vertical to the desired direction so as to shift a position of the hinge shaft. Owing to the position shift of the hinge shaft, the center of gravity of a notebook computer also shifts. Thus, the notebook computer will not flip as easily as before when a force hits the monitor.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate an embodiment of the invention and, together with the description, serve to explain the principles of the invention. In the drawings.

DESCRIPTION OF THE PREFERRED EMBODIMENT

Figure 1:
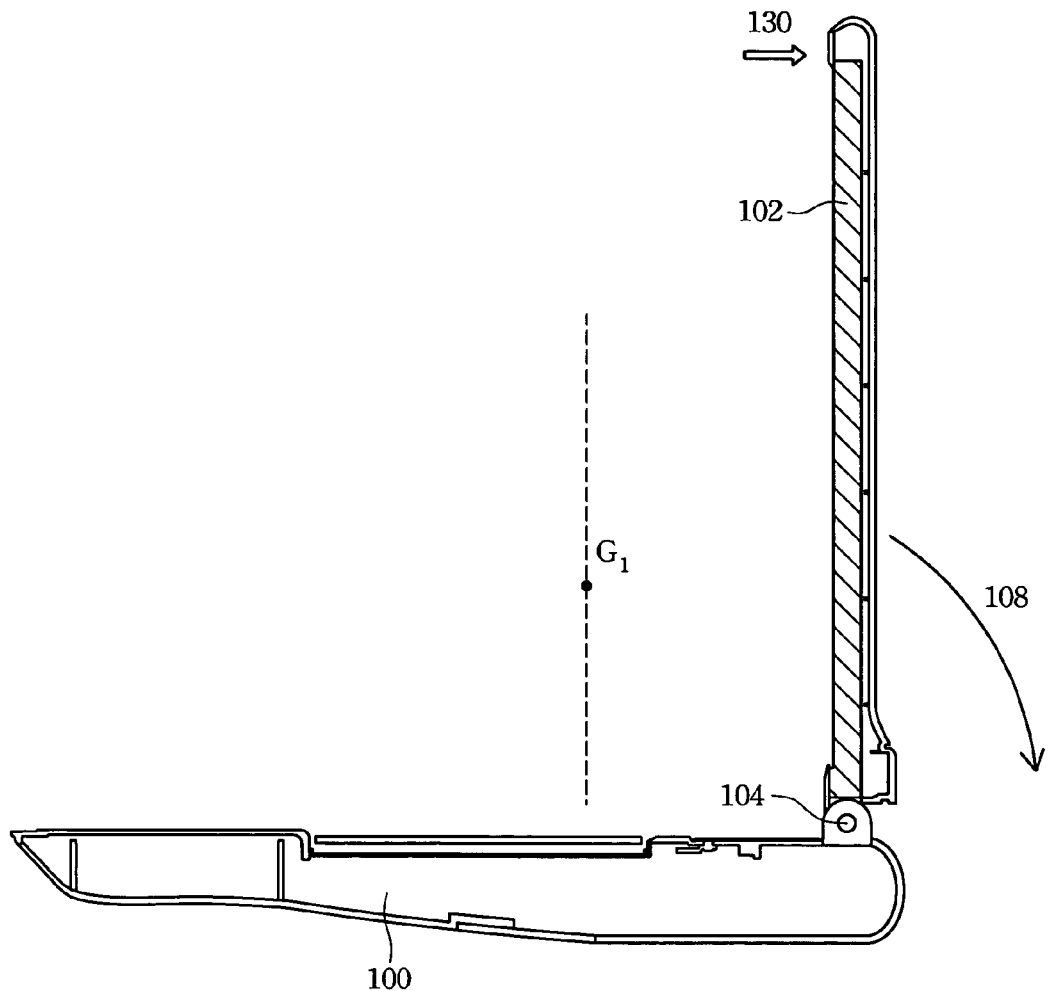
FIG. 1 illustrates a perspective view of a conventional notebook computer.

Reference will now be made in detail to the present preferred embodiment of the invention, examples of which are illustrated in the accompanying drawings. Wherever possible, the same reference numbers are used in the drawings and the description to refer to the same or like parts.

In order to overcome the issue of the notebook computer flipping easily when a force hits the monitor, the present invention discloses a hinge design, which shifts a position of a hinge shaft so as to shift the center of gravity of the notebook computer. The modified center of gravity of the notebook computer prevents the notebook computer from too easily flipping when a force hits the monitor.

Figure 2:
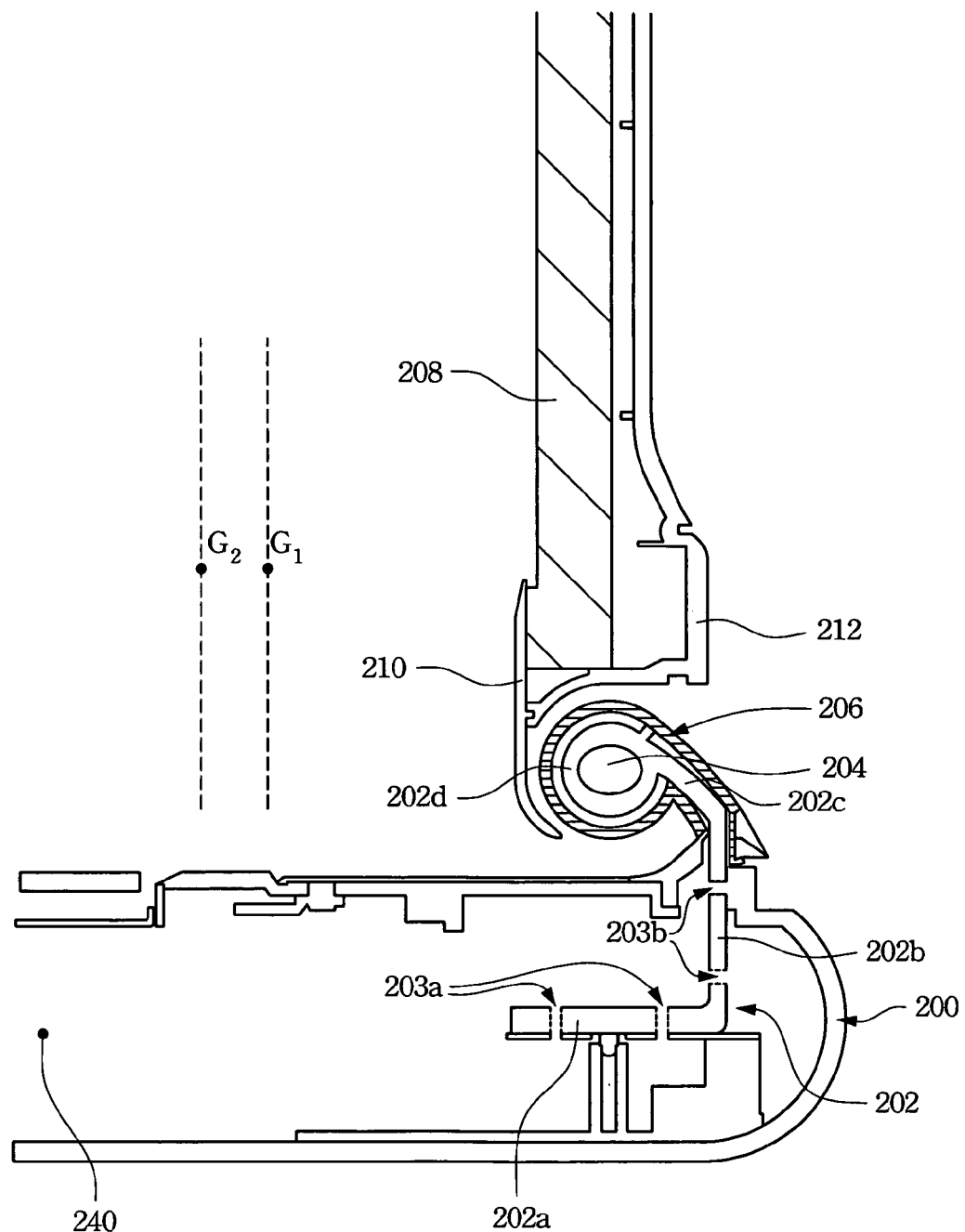
FIG. 2 illustrates a cross-sectional view of a hinge design according to the preferred embodiment of this invention.

FIG. 2 illustrates a cross-sectional view of a hinge design according to the preferred embodiment of this invention. In this preferred embodiment, a hinge consists of a hinge bracket 202 and a hinge shaft 204. The hinge bracket 202 includes a horizontal band 202a, a vertical band 202b, a bent band 202c and a barrel part 202d. The vertical band 202b is connected to the horizontal band 202a; the bent band 202c is connected to the vertical band 202b; and the barrel art 202d is connected to the bent band 202c. The horizontal band 202a and he vertical band 202b are mounted inside a base unit 200. The vertical band 202b and the horizontal band 202a are both fixed via holes 203a and 203b so as to be securely attached to the base unit 200. The bent band 202c out of the base unit 200 bends an angle from the vertical (i.e. extension direction of the vertical band 202b) to the center 240 of the base unit 200, which is at the left of the vertical band 202b, wherein the angle is between zero degree and the 90 degrees. The barrel part 202d (a hollow cylinder) accommodates the hinge shaft 204 partly for rotation. A hinge cover 206 is formed upon the bent band 202c and the barrel part 202d so as to prevent them from damage and oxidation and for better appearance.

Figure 3:
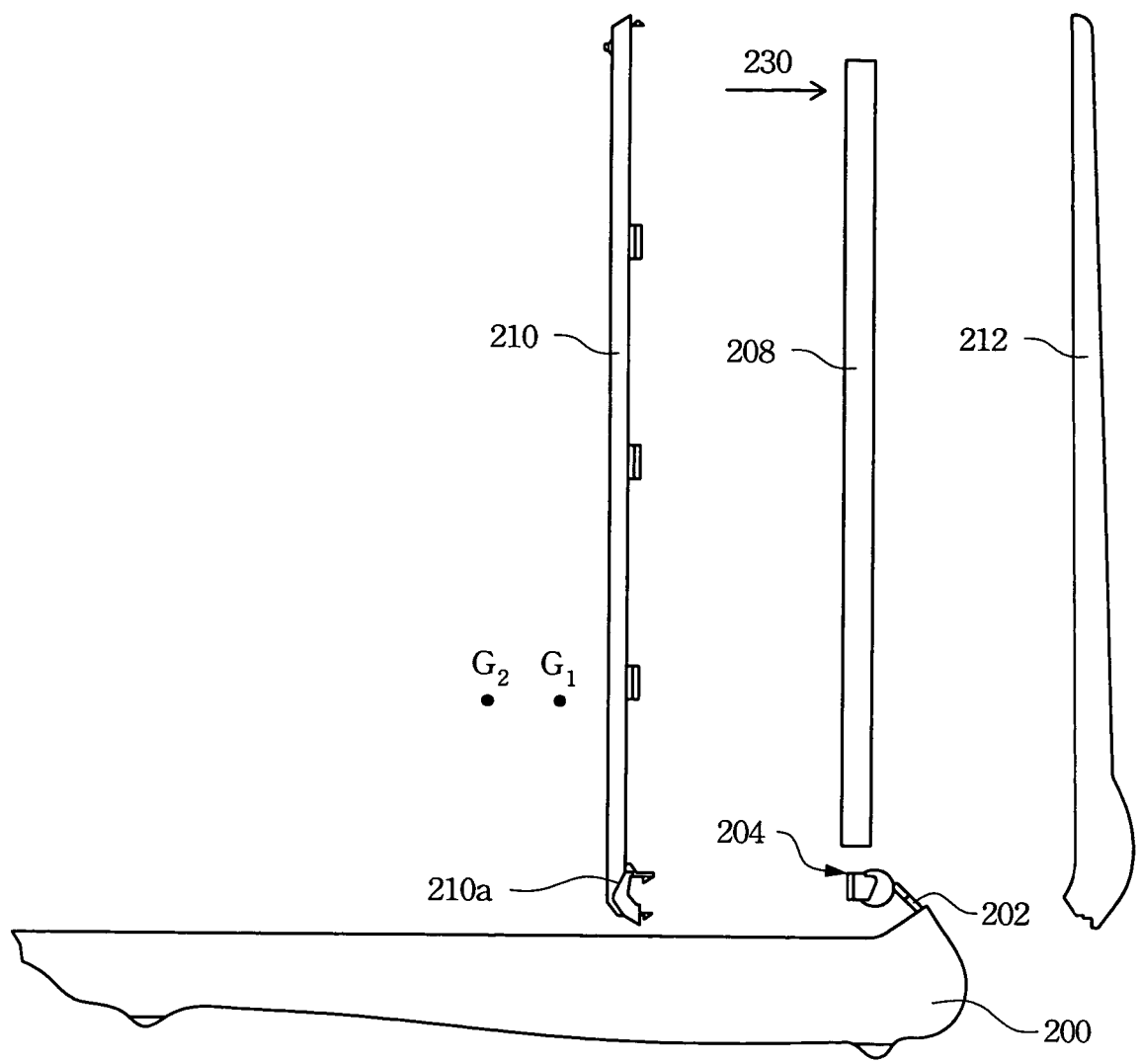
FIG. 3 illustrates an exploded view of a notebook computer according to the preferred embodiment of this invention.

FIG. 3 illustrates an exploded view of a notebook computer according to the preferred embodiment of this invention. A display panel consists of a panel bezel 210, a LCD panel 208 and a panel cover 212. One end 210a of the panel bezel 210 hides a hinge shaft 204 so as not to be seen by users. A hinge bracket 202 is partially mounted inside the base unit 200 and is bent to shift a position of the hinge shaft 204. Owing to the position shift of the hinge shaft 204, the center of gravity $G_1$ shifts to $G_2$ (when the LCD panel 208 is opened at a upright position). The notebook computer with the center of gravity $G_2$ will not flip as easily when a force 230 hits the monitor as the notebook computer with the center of gravity $G_1$.

FIG. 2 shows that the panel bezel 210 is mounted on the inner side of the LCD panel 208. that is against the side of the display panel that folds against the base unit 200. FIG. 2 also shows that a part of the bezel 210 (the lowermost part in FIG.2) is shaped around the barrel part 202d, so that it hides the barrel part 202d.

Figure 4:
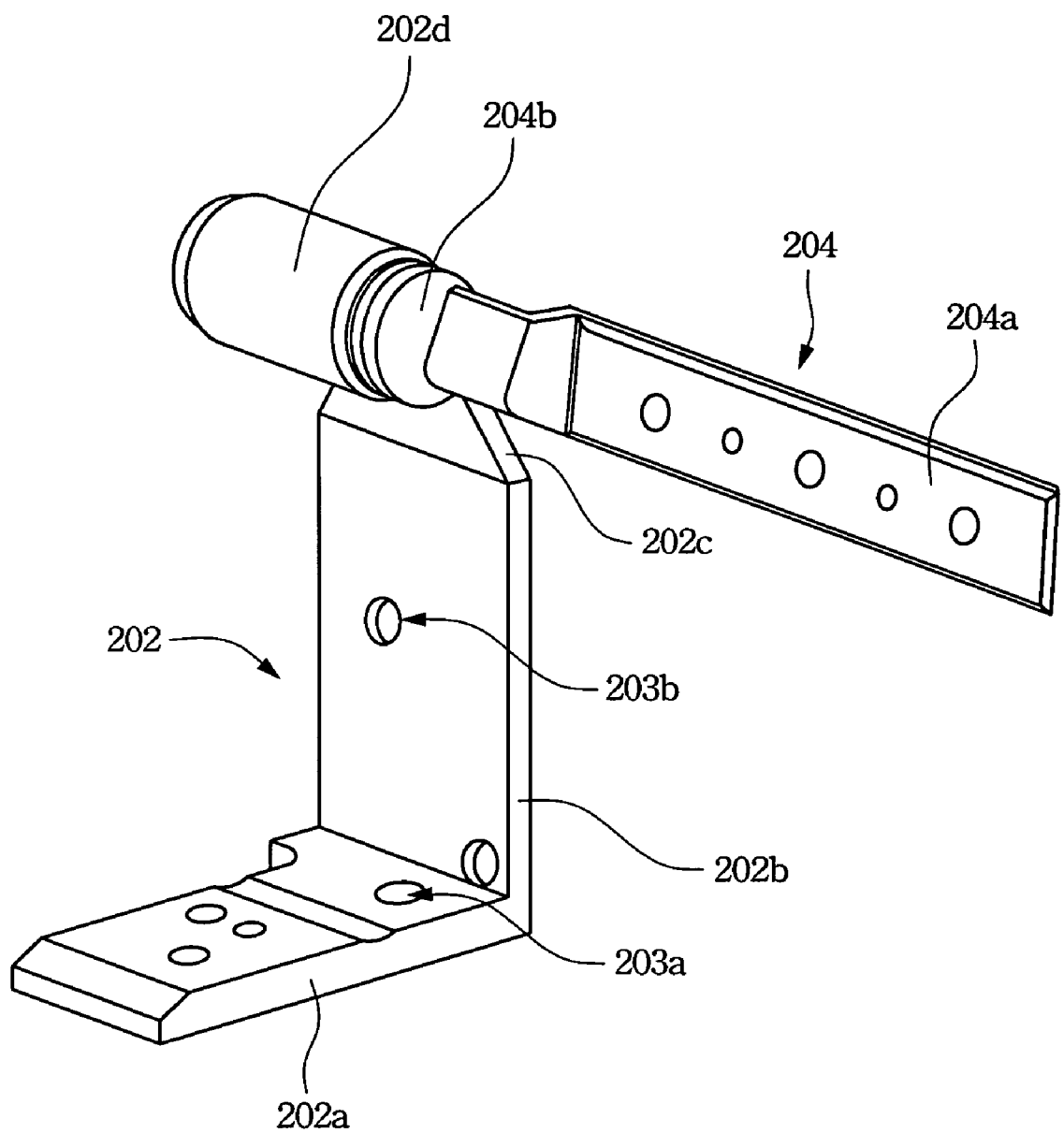
FIG. 4 illustrates an enlarged view of a hinge design according to the preferred embodiment of this invention.

FIG. 4 illustrates an enlarged view of a hinge design according to the preferred embodiment of this invention. The hinge shaft 204 includes an attachment plate 204a and a cylinder part 204b, wherein the attachment plate 204a is for mounting on the display panel 208 (referring to FIG. 3) of a computer, and the cylinder part 204b is set inside the barrel part 202d. The hinge bracket 202 consists of a horizontal band 202a, a vertical band 202b, a barrel part 202*d* and a bent band 202*c*. The horizontal band 202*a* and the vertical band 202*b* include (screw) holes 203*a* and 203*b* thereon for mounting inside the base unit 200 (referring to FIG. 3). The barrel part 202*d* partially accommodates the hinge shaft 204 for rotation using conventional structures, such as a washer and hollow cylinder, to provide frictional force for rotational positioning.

According to the preferred embodiment, a new hinge is designed to shift a position of a hinge shaft. Owing to the position shift of the hinge shaft, the center of gravity of a notebook computer also shifts. Thus, the notebook computer will not flip as easily as before when a force hits the monitor.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hinge design for a notebook computer, the notebook computer including a display panel and a base unit being pivotally connected with said display panel, comprising:
    a hinge shaft, securely attached to the display panel;
    a hinge bracket, having a horizontal band, a vertical band upright connected to said horizontal band, a bent band connected to said vertical band, and a barrel part connected to said bent band, said barrel part partially accommodating said hinge shaft for rotation, wherein said horizontal band and said vertical band are mounted inside the base unit of the computer;
    a hinge cover formed upon said bent band and said barrel part so as to prevent damage and oxidation to them; and
    a panel bezel, mounted on a side of said display panel that folds against said base unit;
    wherein a part of said panel bezel is shaped around said barrel part and hides said barrel part when said display panel is swivelled upright.

2. The hinge design of claim 1, wherein said hinge shaft has an attachment plate for mounting on the display panel of a computer.

3. The hinge design of claim 1, wherein said vertical band has at least one hole thereon for mounting.

4. The hinge design of claim 1, wherein said horizontal band has at least one hole thereon for mounting.

5. A hinge design for a notebook computer, the notebook computer including a display panel and a base unit being pivotally connected with said display panel, comprising:
    a hinge shaft, securely attached to the display panel;
    a hinge bracket, having a horizontal band, a vertical band upright connected to said horizontal band, a bent band connected to said vertical band, and a barrel part connected to said bent band, said barrel part partially accommodating said hinge shaft for rotation, wherein said horizontal band and said vertical band are mounted inside the base unit of the computer, said bent band bends an angle from the extension direction of said vertical band to a center of the base unit;
    a hinge cover formed upon said bent band and said barrel part so as to prevent damage and oxidation to them; and
    a panel bezel, mounted on a side of said display panel that folds against said base unit;
    wherein a part of said panel bezel is shaped around said barrel part and hides said barrel part when said display panel is swivelled upright.

6. The hinge design of claim 4, wherein said hinge shaft has an attachment plate for mounting on the display panel of a computer.

7. The hinge design of claim 4, wherein said vertical band has at least one hole thereon for mounting.

8. The hinge design of claim 4, wherein said horizontal band has at least one hole thereon for mounting.

\* \* \* \* \*